United States Patent [19]

Nighan, Jr. et al.

[11] Patent Number: 5,410,559
[45] Date of Patent: Apr. 25, 1995

[54] DIODE PUMPED LASER WITH STRONG THERMAL LENS CRYSTAL

[75] Inventors: William L. Nighan, Jr., Menlo Park; Mark S. Keirstead, San Jose, both of Calif.

[73] Assignee: Spectra-Physics Lasers, Inc., Mountain View, Calif.

[21] Appl. No.: 191,655

[22] Filed: Feb. 4, 1994

[51] Int. Cl.⁶ .............................................. H01S 3/098
[52] U.S. Cl. ........................................ 372/19; 372/69; 372/39; 372/66; 372/41
[58] Field of Search ...................... 372/101, 69, 41, 75, 372/39, 66, 19, 99

[56] References Cited

U.S. PATENT DOCUMENTS

| | | | |
|---|---|---|---|
| 4,653,056 | 3/1987 | Baer et al. | 372/27 |
| 4,656,635 | 4/1987 | Baer et al. | 372/27 |
| 4,837,775 | 6/1989 | Baer | 372/27 |
| 4,942,582 | 7/1990 | Kintz et al. | 372/41 |
| 5,081,639 | 1/1992 | Snyder et al. | 372/101 |
| 5,127,068 | 6/1992 | Baer et al. | 385/34 |
| 5,132,980 | 7/1992 | Connors | 372/69 |
| 5,245,618 | 9/1993 | Masuda | 372/21 |

OTHER PUBLICATIONS

Frauchiger, J. et al., "Modeling of Thermal Lensing and Higher Order Ring Mode Oscillation in End-Pumped CW Nd:YAG Lasers", IEEE Journal of Quantum Electronics, vol. 28, No. 4, pp. 1046–1055, Apr. 1992.

Tidwell, S. C. et al., "Scaling CW Diode-End-Pumped Nd:YAG Laser to High Average Powers", IEEE Journal of Quantum Electronics, vol. 28, No. 4. pp. 997–1009, Apr. 1992.

Kaneda, Y. et al., "7.6 W of Continuous Wave Radiation in a $TEM_{00}$ Mode from a Laser-Diode End-Pumped Nd:YAG Laser", Optics Letters, vol. 17, No. 14, pp. 1003–1005, Jul. 15, 1992.

Tidwell, S. C. et al., "60-W, Near-$TEM_{00}$, cw-Diode-End-Pumped, Nd:YAG Laser", SPIE vol. 1865, pp. 85–92, 1993.

Hutchinson, S. B. et al., "Advances of 3–10 Watt Average Power Diode Pumped Lasers", SPIE vol. 1865, pp. 61–72, 1993.

*Primary Examiner*—Léon Scott, Jr.
*Attorney, Agent, or Firm*—Mark A. Haynes; Paul David

[57] ABSTRACT

A high power, highly efficient laser that produces a polarized, round diffraction limited gaussian beam is disclosed. A strong thermal lens laser crystal with controlled ellipticity, is mounted in a laserhead and pumped by a fiber-bundle-coupled diode source. The pump beam diameter in the crystal is greater than the crystal's TEM00 mode diameter. The laser operates well over a large range of pump powers. Its slope efficiency in the TEM00 mode is greater than 40%, with an overall efficiency greater than 25%. One of the lasing crystals used is Nd:YVO4. This material exhibits high gain and a short upper state lifetime. These properties make it attractive in designing a Q-switched laser, or one that is insensitive to optical feedback.

48 Claims, 3 Drawing Sheets

DIODE PUMPED LASER WITH STRONG THERMAL LENS CRYSTAL

CROSS-REFERENCE TO RELATED APPLICATIONS

THERMAL LENS OF CONTROLLED ELLIPTICITY, U.S. patent application Ser. No. 08/191,654, filed on the same date as the instant application, inventors Mark K. Kierstead, William L. Nighan, Jr. and Thomas M. Baer, assigned to the assignee of the instant application, incorporated herein by reference.

FIELD OF THE INVENTION

This invention relates generally to diode pumped lasers, and more particularly to lasers that use a diode source to pump a laser crystal that provides a strong thermal lens.

BACKGROUND OF THE INVENTION

Diode lasers, either as discreet diodes, diode arrays, or diode bars, have been utilized to pump a variety of host crystals. Early work by Baer et al. determined that the efficiencies of end-pumped lasers are greatly enhanced by a design that focusses the diode pump light to a diameter in the crystal that is smaller than the TEM00 mode diameter. See for example, U.S. Pat. Nos. 4,653,056 and 4,656,635. This classic discovery has been called "mode-matching".

The effect of mode-matching is to maximize the coupling between the TEM00 mode of the laser resonator and the excited volume in the crystal within the resonator. In turn, the optical slope efficiency and the overall optical efficiency are both maximized. In a classic mode-matched geometry, the ratio R of the TEM00 mode diameter to the pump beam diameter in a diode-end-pumped Nd:YAG laser is typically about 1.3 or greater. At lower pump powers, such as 2 W, mode-matching has proven to be very successful in achieving the required efficiencies and in producing gaussian beams that are very nearly diffraction limited.

At low pump powers, mode-matching techniques work well both for materials with strong thermal lens characteristics (like Nd:YAG and Nd:YV04), and for materials with weak thermal characteristics (like Nd:YLF). This is because pump powers below about 2 W are typically too low to induce a thermal lens of a magnitude that could significantly alter the properties of a typical diode-pumped laser resonator. At higher pump powers, such as those available from 10 and 20 W diode laser bars, thermal effects become significant in end-pumped lasers.

At the higher pump powers of diode bars, thermal lenses of appreciable focussing power can be generated in the laser crystal by the diode pump light. The aberrations that are inherently associated with these strong thermal lenses are thought to limit the efficiency of high power diode-pumped lasers. See for example S. C. Tidwell, J. F. Seamans, M. S. Bowers, A. K. Cousins, IEEE J. Quantum Electron. 24, 997 (1992).

"Strong" and "weak" thermal lensing as follows. With a "strong thermal lens", the focussing power of the pump-induced thermal lens is at least comparable to that of the other optics in the laser resonator. A strong thermal lens significantly changes the size and divergence of a laser resonator eigenmode within the laser resonator. With a "weak thermal lens", the focussing power of the pump induced lens is substantially lower than that of the other optics in the laser resonator, such as mirrors and typical lenses. The thermal lens can be considered weak if the other optics in the laser resonator dictate the size and divergence of the resonator eigenmode, while the thermal lens has little effect on the eigenmode properties.

High aberration materials have some material properties that make them suitable for certain applications. With respect to Nd:YLF, Nd:YVO4 exhibits high gain and a short upper state lifetime. Nd:YAG has an intermediate gain and an intermediate upper state lifetime. These properties provide important adjustable parameters when designing a Q-switched laser with high pulse energy or high repetition rate, or a laser that is insensitive to optical feedback. Additionally, certain properties of Nd:YVO4 make it attractive for diode pumping; its absorption coefficient at the diode pump wavelength of ~809 nm is extremely high, permitting efficient coupling of diode pump light into the Nd:YVO4 crystal.

There are ready examples of materials with strong and weak thermal lens characteristics. Examples of materials that tend to exhibit strong thermal lenses are Nd:YAG and Nd:YV04. Pump-induced surface distortion can contribute to the thermal lens magnitude, but the effect is primarily due to a strong dependence of the material's index of refraction upon the local temperature in the material. While this dependence is about one order of magnitude smaller for Nd:YLF that it is for Nd:YAG and Nd:YV04, it should be noted that even the focussing, or defocussing, power of a thermal lens in a material like Nd:YLF must be considered in a laser resonator if its focussing power is comparable to that of the other intracavity optics. As an example of a weak thermal lens, it is usually possible to design a laser resonator using Nd:YLF in a way that results in a thermal lens of focussing power that is weaker than that of other intracavity optics.

It is important to note that a diode-pump-induced thermal lens is not a perfect lens, but is rather an aberrated lens. In a typical high power diode-pumped laser design, a strong thermal lens is inherently an aberrated thermal lens. It is thought that the aberrations in the strong pump induced thermal lenses limit the efficiency of high power diode bar pumped lasers. See for example, S. C. Tidwell, J. F. Seamans, M. S. Bowers, A. K. Cousins, IEEE J. Quantum Electron. 24,997 (1992). This is because the thermally-induced aberrations add significant diffractive loss to resonators when conventional mode-matching techniques are employed. An aberrated thermal lens as one where the optical path differences a function of radius cannot be adequately fit by a simple parabola. A hypothetical perfect thermal lens would have an optical path difference as a function of radius that could be fit by a perfect parabola. For a typical aberrated thermal lens, the optical path difference as a function of radius is most nearly parabolic near its center, but deviates strongly from a parabola in its wings, as heat flows out of the pumped center into the surrounding crystal. See for example J. Frauchiger, P. Albers, H. P. Weber, IEEE J. Quantum Electron. 24, 1046 (1992).

It has been reported that the efficiency of a laser system with aberrated thermal lensing is reduced with respect to a laser system without aberrated thermal lensing because the thermal aberration acts as a pump-power dependent loss in the laser resonator. In order to make a relative comparison to a high power, high efficiency laser, this particular type of diode-pumped laser is used as a benchmark. The reference laser is a diode-bar-pumped Nd:YLF laser, as reported by S. B. Hutchinson, T. Baer, K. Cox, P. Gooding, D. Head, J. Hobbs, M. Keirstead, and G. Kintz, "Advances of 3–10 Watt Average Power Diode Pumped Lasers" in Diode Pumping of Average Power Solid State Lasers, G. F. Albrecht, R. J. Beach, S. P. Velsko, Editors, Proc. SPIE 1865, 61–72. The authors report a diode-bar-pumped Nd:YLF laser that was designed in a way that the thermal lens of the Nd:YLF could be considered weak, therefore presented only weak thermal aberrations. This laser provided 6 W of polarized output power (P0) in a TEM00 mode of $M2 < 1.1$ for 17 W of diode-bar pump power incident (Pi) upon the Nd:YLF gain media. The optical efficiency (po/Pi) of this laser is $\sim 35\%$, while the optical slope efficiency (dP0/dPi) is $\sim 40\%$. This laser is a highly efficient, high power laser and can be considered a benchmark as a high power, highly efficient diode-bar-pumped laser that operates in a nearly diffraction-limited TEM00 mode. Any diode-bar-pumped laser with comparable power and optical efficiency in a nearly diffraction-limited TEM00 mode can therefore be called a highly efficient, high power, diode-bar-pumped laser.

High power diode-bar-pumped lasers that have been built using crystals that present strong thermal lenses have been reported to be less efficient than this benchmark. For example, overall optical efficiencies (Po/Pi) of only about 16% have been reported for end-pumped Nd:YAG operating in the TEM00 mode at the 6 W output level. The reported multimode efficiency achieved with Nd:YAG is higher, but multimode beams are not useful for many applications. See for example S. C. Tidwell, J. F. Seamans, M. S. Bowers, A. K. Cousins, IEEE J. Quantum Electron. 24, 997 (1992). A 26% optical efficiency (Po/Pi) was reported for an Nd:YAG laser at the 60 W level, but the TEM00 laser beam quality was worse than our benchmark at $M2 < 1.3$, the beam was unpolarized, and the laser used an aspheric optic for aberration compensation that worked over only a narrow range of pump power. See for example S. C. Tidwell and J. F. Seamans, "60-W near TEM00, cw diode-end-pumped Nd:YAG laser", in Diode Pumping of Average Power Solid State Lasers, G. F. Albrecht, R. J. Beach, S. P. Velsko, Editors, Proc. SPIE 1865, 85–92. One report also indicated a 36% optical efficiency (Po/Pi) for a TEM00 Nd:YAG laser at the 7.6 W output level, pumped by 38 individual, polarization combined, fiber coupled diodes that provided an incident power of 21.1 W. A serious drawback of this system is that diode bars were not used, hence the tremendous complexity, cost, and low wallplug efficiency (Po divided by electrical input power) of 38 individual polarization combined fiber-coupled diodes. This was reported by Y. Kaneda, M. Oka, H. Masuda, and S. Kubota, "7.6 W of cw radiation in a TEM00 mode from a laser-diode-end-pumped Nd:YAG lasers", Opt. Lett. 17, 1003 (1992).

In spite of all of these difficulties, it would be very useful to develop a diode-bar-pumped laser that can make use of strong thermal lens materials and still operate at high power with high efficiency in a nearly diffraction-limited TEM00 mode. This is because some of these strong thermal lens materials have other desirable properties that make them desirable for certain applications. With respect to Nd:YLF, Nd:YVO4 exhibits high gain and a short upper state lifetime. Nd:YAG has an intermediate gain and an intermediate upper state lifetime. These properties provide important adjustable parameters when designing a Q-switched laser with high pulse energy or high repetition rate, or a CW laser that is insensitive to optical feedback. Additionally, certain properties of Nd:YVO4 make it attractive for diode pumping; its absorption coefficient at the diode pump wavelength of $\sim 809$ nm is extremely high, permitting efficient coupling of diode pump light into the Nd:YVO4 crystal.

Strong thermal lens materials like Nd:YAG and Nd:YVO4 have been used in certain lasers with pump powers greater than 2 W. However, strong, aberrated thermal lenses are generated in end-pumped configurations. This is primarily because the index of refraction in these materials is a strong function of temperature, and the deposition of heat by the pump beam induces large thermal gradients. It has been generally believed that strong thermal lensing is a hindrance in the design and construction of an efficient laser with high beam quality, and therefore, there has not been great success in the use of strong thermal lens materials in highly efficient, high power diode-bar-pumped lasers.

Aberrations in the pump-induced thermal lens can be cancelled or corrected with specially shaped aspheric lenses or aspheric crystal faces within the laser cavity. Ideally, if the pump-induced aberrations are perfectly corrected, a favorable ration R (greater than unity) of TEM00 mode diameter to pump beam diameter can be employed, and optical efficiencies can approach those of more conventional mode-matched lasers that do not have significant aberration. There are, however, some significant limitations to these types of non-dynamic compensation schemes. They do not work well over a range of pump powers since the magnitude of the thermal lens, and its aberrations, is a dynamic function of the pump and intracavity powers. These designs have limited appeal because they work over a very small range of diode pump powers.

A need exists for highly efficient lasers. A low efficiency laser requires more diode pump power to achieve a desired laser output power. Increasing the pump power from a particular diode bar source increases the temperature of the diode junction, and the lifetime of the diode source is degraded in a predictable but highly undesirable way. This is unacceptable for applications that require long life. A low efficiency laser may require the use of additional diode sources to achieve a particular laser output power. This may be unacceptable for applications that are sensitive to cost or complexity.

There is also a need for a highly efficient, high power laser design that uses strong thermal lens materials and provides high quality beams over a range of pump powers. Additionally, it would be desirable to provide a diode-pumped laser employing strong thermal lens materials that can effectively operate in a Q-switched mode, or that can operate in a CW mode that is insensitive to optical feedback.

Finally there is a need for lasers that are acceptable for applications that are sensitive to cost or complexity.

Laser crystals with high thermally induced phase aberrations, such as Nd:YAG and ND:YVO4, have been considered for higher power diode pumped laser, having 2 W or greater output power. However, the thermal lens magnitudes in Nd:YAG and Nd:YVO4 are very large in high power end-pumped geometries because the variation of the indices of refraction of these materials as a function of temperature are large. Accompanying the large focal powers of the thermal lenses are high aberrations. It is reported that these large aberrations limit the efficiency of high power systems that use highly aberrating materials. Thermal aberrations in Nd:YLF, a material with low aberrations, are about an order of magnitude less in similar end-pumped geometries because the dn/dt is much smaller than for Nd:YAG or Nd:YVO4. It has been generally believed that strong thermal lensing is a hindrance in the design and construction of an efficient laser with high beam quality, and therefore, the use of high aberration materials at higher pump powers has been limited.

Aberrations in the pump-induced thermal lens can be cancelled or corrected with specially shaped aspheric lenses as aspheric crystal faces in the laser cavity. Ideally, if the pump-induced aberrations are perfectly corrected, a favorable ratio, greater than unity, of TEM00 mode diameter to pump beam diameter can be employed, and optical slope efficiencies can approach those of more conventional mode-matched lasers that do not have significant aberration. There are, however, some significant limitations to these types of non-dynamic compensations schemes. They do not work well over a range of pump powers since the magnitude of the thermal lens, and its aberrations, is a dynamic function of the pump and intracavity powers. These designs have limited appeal because they work over a very small range of pump powers.

SUMMARY OF THE INVENTION

Accordingly, an object of the invention is to provide a diode-pumped laser with a strong thermal lens that is highly efficient while operating in the TEM00 mode and produces a polarized output.

Another object of the invention is to provide a diode-pumped laser with a strong thermal lens crystal that is highly efficient while operating in the TEM00 mode over a wide range of pump powers and produces a polarized output.

Another object of the invention is to provide a diode-bar-pumped laser with a strong thermal lens crystal that is highly efficient while operating in the TEM00 mode with high output polarized power.

Another object of the invention is to provide a diode-pumped laser that is highly efficient while operating in the TEM00 mode, and has a polarized output beam that is nearly diffraction limited with an M2 value less than about 1.2.

Still a further object of the invention is to provide a diode-pumped laser that is highly efficient, and the ratio of the TEM00 mode diameter to the pump beam diameter in the laser crystal is less than unity, and produces a polarized output.

Yet another object of the invention is to provide a diode-pumped laser that operates effectively in the Q-switched mode and produces a polarized output.

Another object of the invention is to provide a diode-pumped laser using an Nd:YVO4 laser crystal.

A further object of the invention is to provide an efficient laser with an Nd:YVO4 crystal that operates in the TEM00 mode when pumped by a fiber bundle coupled diode bar pump source.

These and other objects of the invention are achieved with a nearly diffraction limited, high efficiency diode-pumped laser that includes a resonator mirror, and an output coupler defining a laser resonator with a resonator optical axis. A strong thermal lens laser crystal, with a TEM00 mode diameter, is mounted in the resonator along the resonator optical axis. A diode-pump source supplies a pump beam to the crystal and produces a polarized substantially round output beam. A power source supplies power to the diode-pump source. Additionally, an image device can be included to focus a portion of the pump beam to a pump beam diameter in the crystal greater than the TEM00 mode diameter.

In one embodiment, a pump induced thermal lens with a focal length fx in a x direction, a focal length fy in a y direction, and a desired fx/fy ratio is provided in order to control the ellipticity of the thermal lens. Included is an anisotropic crystal with opposing first and second end faces through which a pump beam and an output beam pass. A mount supports the crystal and directs heat flow in the crystal in a direction that produces the desired fx/fy ratio.

Nd:YVO4 is one of the preferred laser crystals. The classical elliptical thermal lens properties of the crystal are modified so the laser produces a round beam. This can be achieved by creating a heat conduction path through the "c" axis crystal faces that are normal to a "c" axis of the crystal. The "a" faces of the crystal, normal to the "a" axis of the crystal, are thermally isolated. Nd:YVO4 is a useful laser crystal because it exhibits high gain and a short upper state lifetime. These properties make the laser particularly useful for short pulse, high repetition rate Q-switching and in applications where insensitivity to optical feedback is important. The upperstate lifetime is approximately five times shorter than that of Nd:YLF, while the stimulated emission cross section is about seven times larger than that of Nd:YLF. Oscillations due to feedback damp out on the order of seven times faster in a high power Nd:YVO4 laser than in a high power Nd:YLF laser. This is significant for image recording applications. An additional positive attribute of Nd:YVO4 is that its absorption coefficient at the diode pump wavelength of ~809 nm is extremely high, efficient coupling of diode pump light into the Nd:YVO4 crystal is possible.

Management of heat flow in the crystal produces the desired fx/fy ratio for the thermal lens, and hence the ellipticity of the thermal lens is controlled. In one embodiment, creating a heat conduction path along the "c" crystal faces produces a substantially round thermal lens. The ratio of the TEM00 mode size to the pump beam size is less than unity, which is known to minimize diffractive loss but has been reported to result in an inefficient TEM00 laser. A plurality of fibers, gathered into a bundle, can be used to guide the diode pump light, creating the top hat shaped pump beam geometry. In spite of an unfavorable ratio of TEM00 mode size to pump beam size, the laser is highly efficient in a high power, TEM00 mode.

The laser's optical slope efficiency in the TEM00 mode is greater than 40%, and the overall optical efficiency greater than 30%. For example, 7 W of polarized, nearly diffraction limited output are generated for 16 W of pump power. Multiple pump source designs yield over 50 W output comparable efficiencies. The ratio of the TEM00 mode diameter to the nearly top hat shaped pump beam can be in the range of 1.2 to about 0.6, and preferably about 0.83. A diffraction limited gaussian output beam is generated that is a substantially round. The M2 of the output beam is typically less than about 1.2, and is as low as 1.05, and the least squares deviation of the beam profile from a gaussian is less than about 10%, and is as low as 17. The combination of a strong thermal lens material, high power pumping and a non-mode matched geometry with a fiber bundle coupled diode pump source results in a high power, highly efficient, TEM00 laser which produces a polarized output.

While non-dynamic compensation schemes have been used to correct the aberrations in the pump-induced thermal lens, these do not work well over a range of pump powers. Dynamic schemes have been proposed but not successfully demonstrated. The laser of the present invention works well over a large range of pump power without any aberration compensation schemes.

A diode pumped laser with a strong thermal lens laser crystal is now available for applications that require high efficiency, a high power, and high quality beam from a simple reliable laser source.

DETAILED DESCRIPTION OF THE DRAWINGS

DETAILED DESCRIPTION OF THE PREFERRED EMBODIMENTS

The invention is a nearly diffraction limited, high power, high efficiency diode pumped laser. It includes at least one resonator mirror and an output coupler. These define a laser resonator with a resonator optical axis. A strong thermal lens laser crystal is mounted in the resonator. A diode pump source supplies a pump beam to the laser crystal, producing a polarized substantially round output beam.

The laser's optical efficiency is greater than 25%. High power TEM00 operation of the laser is an output beam greater than 4 W in a TEM00 mode. Its output is substantially TEM00, or near diffraction limited, if at least 95% of the entire output beam is measured to an M2 value less than 1.2, where M2 is defined as the ratio of theoretical confocal parameter of a beam as predicted by an extracavity waist size to the actual measured confocal parameter. The output beam has a least squares deviation with nearly all of the actual beam profile from an ideal gaussian profile of less than 10%. Additionally the output beam is polarized. In certain embodiments, the laser may use a laser crystal where the diode pump induced thermal lens in the crystal provides an optical path difference as a function of radius that is not described by a parabolic profile.

Figure 1:
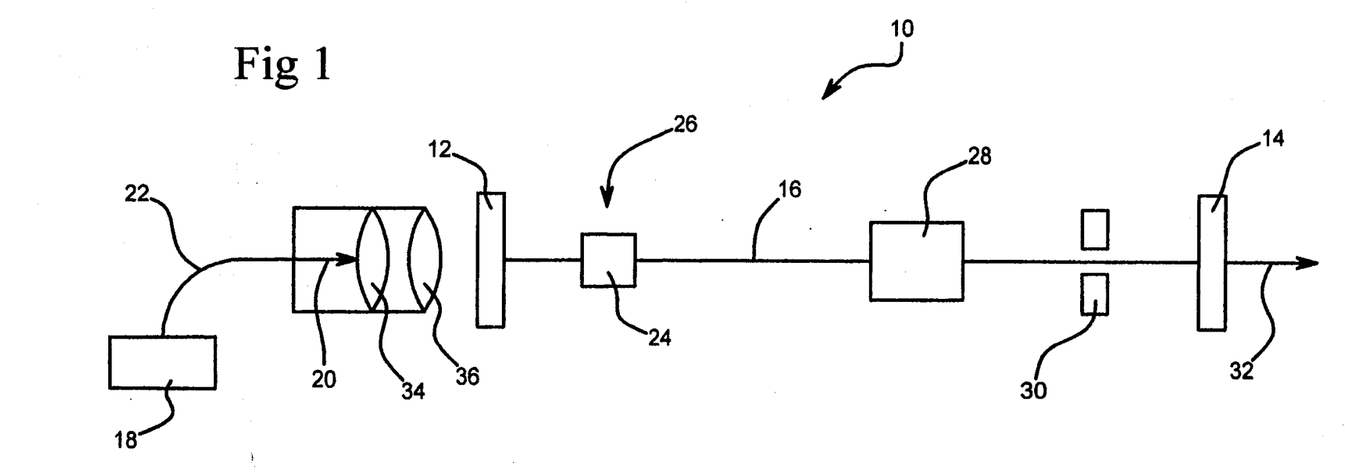
FIG. 1 is a schematic diagram of the diode pumped laser with the high aberration crystal positioned within the resonator.

Referring to FIG. 1, a diode pumped laserhead 10 is defined by a resonator mirror 12, an output coupler 14 and a resonator optical axis 16. A diode source 18 provides a pump beam 20. Resonator mirror 12 is highly transmitting at the diode pumping wavelength of diode source 18. This standard optical coating can be applied to a surface of the laser crystal. A plurality of resonator mirrors can be used. Diode source 18 can be a single diode, spatial emitter, diode bar or a plurality of diodes or diode bars. Preferably, a diode bar is used because it is high power. A suitable 20 W diode bar source 18 is model No. OPC-A020-810-CS, available from Opto-Power Corporation, City of Industry, Calif. Preferred wavelengths of diode source 18 are in the range of 780 to 815 nm. Wavelengths of specific crystals are as follows: Tm:YAG—785 nm; Nd:YLF—797 nm; and Nd:YAG and Nd:YVO4—809 nm. The diode pump source wavelengths are temperature tuned to optimize absorption in the laser crystal.

Diode source 18 is coupled to one or more optical fibers 22. Preferably, a bundle of optical fibers 22 are utilized. Suitable fibers 22 include but are not limited to those that have silica cores with silica cladding. Coupling can be accomplished as set forth in U.S. Pat. No. 5,127,068.

Positioned along optical axis 16 is a strong thermal lens laser crystal 24 mounted in a heat sink 26. The characteristics of laser crystal 24 are, its indices of refraction vary as a function of temperature, particularly in high power end-pumped geometries. With higher pump powers, greater than about 5 W, the effect of thermally induced phase aberrations are significant. This variation of the indices of refraction is on the order of about $3 \times 10 - 6/°K$. for light polarized parallel to the "c" axis of Nd:YVO4.

Suitable crystal 24 materials include but are not limited to Nd:YVO4, Nd:GVO4 Nd:YPO4, Nd:BEL, Nd:YALO and Nd:LSB. Nd:YAG can be used when an intracavity polarizing element is present. A preferred crystal 24 material is Nd:YVO4, available from Litton-Airtron, Charlotte, N.C. The atomic percentage of Nd is in the range of 0.5 to 3.0%, preferably about 0.6 to 0.9% and most preferably about 0.8%.

It is known that the thermal aberrations in Nd:YLF are approximately an order of magnitude less than those of high aberration materials in similar end-pumped geometries because dn/dT is much smaller than that for Nd:YAG and Nd:YVO4. Nd:YVO4 is an attractive material because, compared to Nd:YLF, it exhibits high gain and a short upper state lifetime. Nd:YAG has an intermediate gain and an intermediate upper state lifetime which is also useful. Nd:YVO4 is also suitable for diode pumping because its absorption coefficient at the diode pump wavelength of ~809 nm is extremely high, permitting efficient coupling of diode pump beam 20 into crystal 24.

These properties are important when designing a Q-switched laser, or one that is insensitive to optical feedback. For example, Nd:YVO4 can be used for short pulse, high repetition rate Q-switching, and also allows oscillations due to optical feedback to damp out about 7 times faster than in Nd:YLF. This is critical for high speed image recording. Optionally included in laserhead 10 is a Q-switch 28. A suitable Q-switch 28 is available from NEOS Technologies, Melbourne, Fla. Also included in laserhead 10 is an aperture stop 30 to improve the generation of a TEM00 output beam 32.

A pair of standard spherical lenses 34 and 36, available from Melles Griot, Irvine, are used to image and overlap a portion of pump beam 20 onto an optical end face of crystal 24. Lenses 34 and 36 optimize the size of pump beam 20 to a particular ratio R of TEM00 mode size to pump beam size, and also optimize the size of pump beam 20 to avoid fracture of crystal 24 while increasing output power. An optimal ratio R is about 0.83. Other devices that can be used to achieve the imaging include but are not limited to single lenses or reflective optics.

The length of the cavity defined in laserhead 10 can vary. A suitable length is in the range of about 3 to 30 cm. In one embodiment it is about 10 cm.

Figure 2:
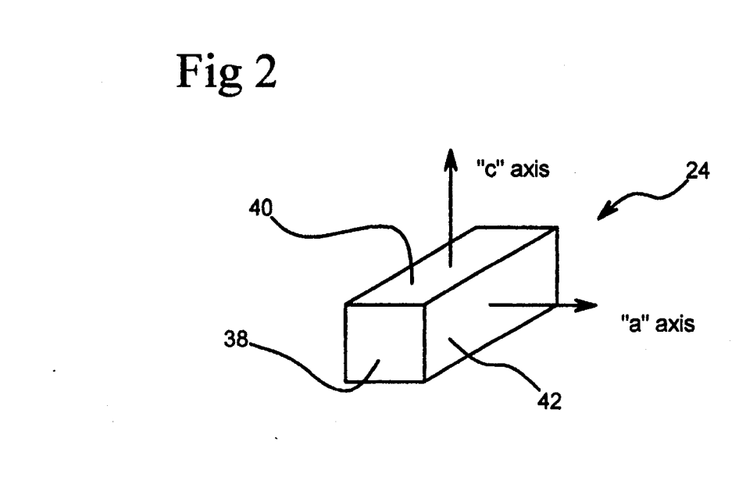
FIG. 2 is a perspective view of the high aberration crystal in a non-cylindrical geometry showing an optical end face, one of the "c" axis crystal faces that is normal to a "c" axis of the crystal and one of the "a" axis crystal faces that is normal to an "a" axis of the crystal.

In FIG. 2, crystal 24 is shown having an end face 38, a "c" axis crystal face 36 normal to a "c" axis of crystal 24, and an "a" axis crystal face 38 normal to an "a" axis of crystal 24. This terminology refers to a uniaxial crystal; the labels do not apply to Nd:YAG. Faces 38, 40 and 42 have corresponding opposing faces, not shown, that are flat, generally parallel but may be wedged in an amount of about 1°.

The geometry of crystal 24 can vary. Although a cylindrical geometry is possible, non-cylindrical is preferred. Suitable geometries are cubic or rectangular. Geometry and size of crystal 24 are important considerations. In one embodiment, crystal 24 has end face 38 dimensions of greater than 1 mm, and preferably about 3 to 4 mm. The length of crystal 24 can correspond to the dimensions of end face 38. Additionally, in the rectangular geometry, a length of about 1 to 10 mm is suitable, and more preferably about 4 to 8 mm.

The actual size of crystal 24 is important. If it is infinitely large, then heat flow is difficult to manage and an elliptical output beam is generated. In this instance, the exterior surfaces of crystal 24 have thermal gradients that are too low to control the heat conduction path. However, control of heat conduction is much easier and pronounced with smaller crystals.

Optical, thermal and mechanical characteristics of the Nd:YVO4 crystal 24 are different along the "a" and "c" axes. The thermal expansion coefficient in a direction parallel to the "a" axis is about 2.5 times smaller than that parallel to the "c" axis. The variation of the index of refraction as a function of temperature is different by about a factor of about 2.8 along the "c" and "a" axes. Because Nd:YVO4 is so strongly birefringent, there is more than a 10% difference between the indices of refraction for the two crystallographic axes.

Figure 3:
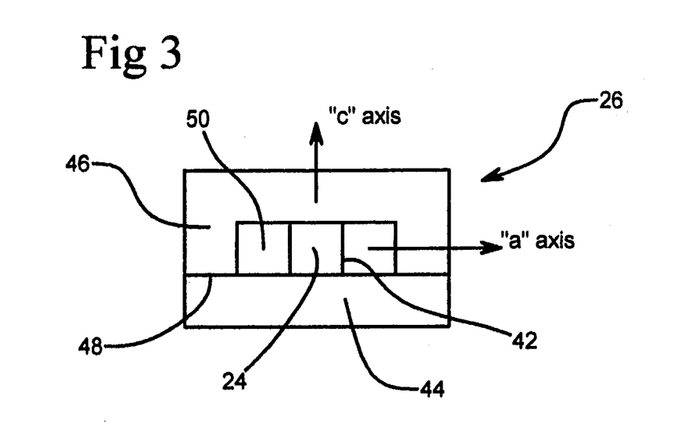
FIG. 3 is a sectional diagram of the high aberration crystal mounted in a heat sink.

As shown in FIG. 3, crystal 24 can have a thermal lens of controlled ellipticity, such as circular, by proper mounting to heat sink 26. Heat sink 26 can be made of copper but other suitable materials include aluminum or alumina. Heat sink 26 can be configured into sections 44 and 46. A solder 48 is deposited on "c" axis crystal face 36, as well its corresponding opposing face, in order to reduce thermal impedance between the faces and heat sink 26. A suitable solder has a low melting temperature, such as Indium Solder 1E, available from the Indium Corporation of America, Utica, N.Y. Other materials are possible and can include thermally conductive epoxies such as Tra-Bond 2151, available from Tra-Con, Inc., Medford, Mass., as well as thermal greases including Dow Corning 340, available from Dow Corning Corporation, Midland, Mich. Heat sink 26, and its respective sections 44 and 46, can be plated in order to improve the adherence to the solder. Satisfactory plating materials include but are not limited to nickel or silver. An air gap 50 is formed at the exterior of "a" axis crystal face 42 and its corresponding opposing face.

Sections 44 and 46 can be "tinned" with indium prior to assembly with crystal 24. One technique for soldering crystal 24 in place is to wrap it in one or two layers of 1-2 mil indium foil, position it between sections 44 and 46 of the pretinned heat sink 26, and then place the entire assembly on a hot plate at about 175° C.

Air gap 50 creates thermal isolation between the "a" axis crystal faces and heat sink 26. Alternatively, air gap 50 can be eliminated by substituting an insulating material between heat sink 26 and the "a" axis crystal faces. Suitable insulating materials include but are not limited to epoxies such as 2135D, available from Tra-Con, Inc., Medford, Mass. A heat conduction path, not shown, transfers thermal energy from crystal 24 out through the "c" axis crystal faces. Managing the heat flow in this manner produces a round, diffraction limited output beam 32.

Figure 4:
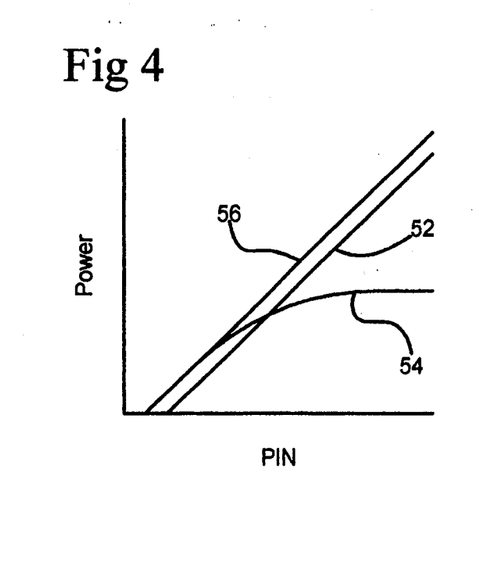
FIG. 4 is a graph illustrating the output power of three lasers. The first has a laser crystal with weak thermal lensing and low aberrations, the second uses a laser crystal with strong thermal lensing and therefore strong aberrations high aberrations, and the third is one embodiment of the present invention where only a portion of the pump beam is focussed on the TEM00 mode diameter.

As shown in FIG. 4, diffraction loss due to aberrative lensing in an end-pumped system with a classic mode-matched geometry results when a strong thermal lens and aberration material, such as Nd:YVO4 is end-pumped. Line 52 represents a material such as Nd:YLF where there is little thermal aberration loss because the thermal lens is weak. The thermal lens generated in Nd:YVO4 is strong, and aberrated. With Nd:YVO4, if a classic mode-matched geometry is used, significant diffractive loss is experienced by the TEM00 mode, and output power rolls off as pump power is increased, as illustrated by line 54. If only the best part of pump beam 20 overlaps Nd:YVO4 crystal 24, then the amount of thermal aberration acting as a loss is greatly reduced. If optimized by adjusting the ratio of the TEM00 mode diameter to the pump beam diameter, to a value less than unity, performance of the non-mode-matched Nd:YVO4 laser can be that of line 56. It can be superior to line 52, which is not taught in the prior art. A high power, high efficiency TEM00 laser results.

Figure 5:
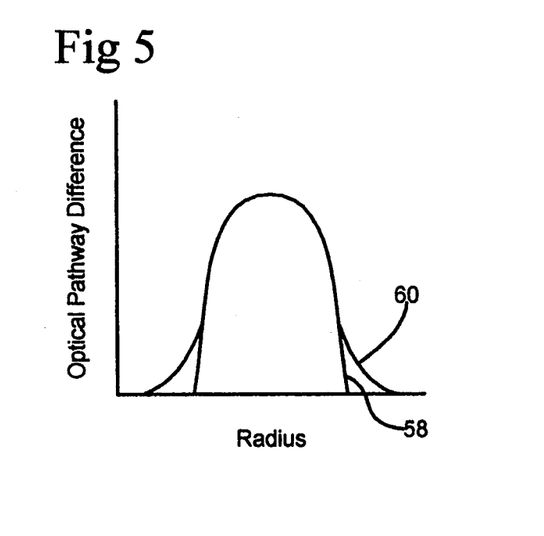
FIG. 5 is a graph, shown as a parabola, of the optical pathway difference as a function of radius for a perfect lens, and compares it with the strong pump induced non-parabolic phase distortions typical with high aberration materials.

Nd:YVO4 can act as a thermal lens. As illustrated in FIG. 5, a perfect lens provides an optical pathway difference as a function of radius that results in a perfect parabola 58. With a strong thermal lens and strong aberration material like Nd:YVO4, pump-induced non-parabolic phase distortions lower the efficiency of the laser operating in the TEM00 mode. Instead of the perfect parabola 58, the resulting profile has aberrated wings, represented by distorted parabola 60.

Figure 6:
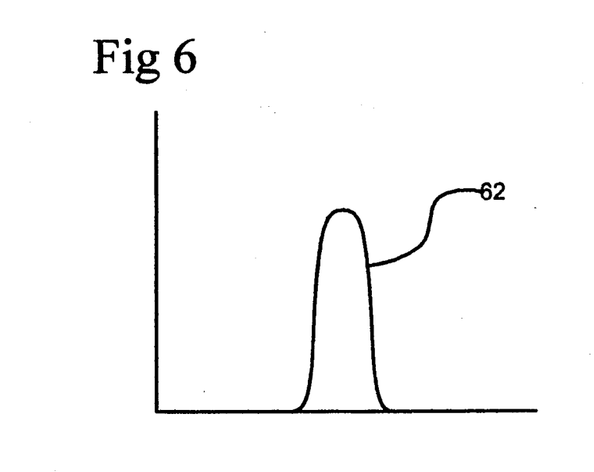
FIG. 6 illustrates the gaussian profile output that is typical of a diode pump source with a single optical fiber.
Figure 7:
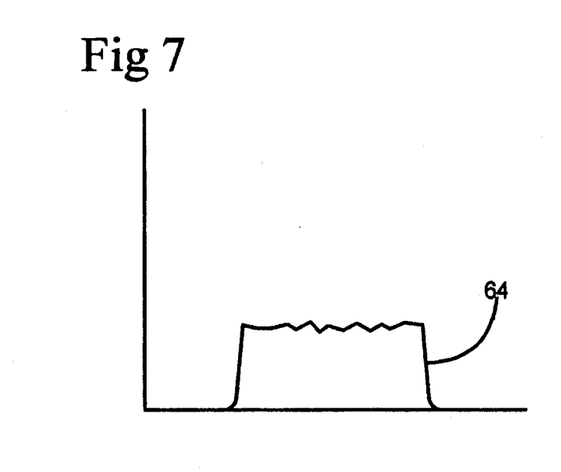
FIG. 7 illustrates the top hat profile output associated with multiple bundled fibers.

Single optical fibers have a peak intensity that results in a semi-gaussian shaped beam 62, shown in FIG. 6. When a bundle of fibers is used, the combination does not yield as pronounced a peak intensity. Instead, the combination produces a square wave shape, commonly referred to as a "top hat" shaped beam geometry 64, illustrated in FIG. 7.

The central portion of an end-pump-induced thermal lens, such as Nd:YVO4, is a better approximation to a perfect lens than are its aberrated wings. Because of this affect, in one embodiment only the central portion of pump beam 20 is used to overlap the TEM00 mode at optical end face 38. This is achieved by focussing pump beam 20 through lenses 34 and 36 to the desired size. Suitable ratios of TEM00 mode diameter to pump beam diameter are from 1.2 to as low as 0.6. In one embodiment, it is 0.83.

Figure 8:
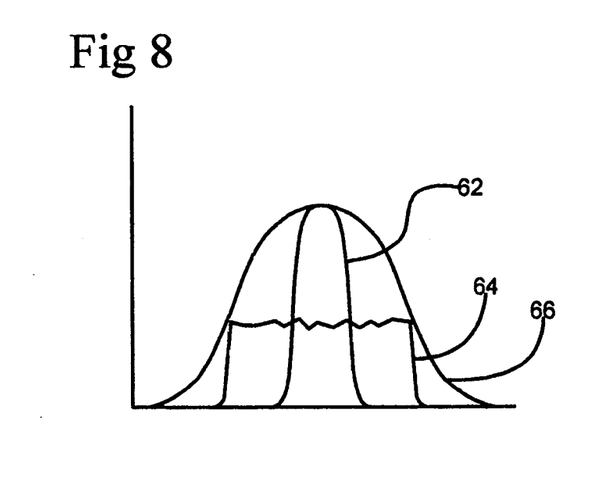
FIG. 8 is a graphical representation illustrating the relationship between the TEM00 pump diameter and the top hat profile of FIG. 7.

The ratio of the TEM00 mode diameter in crystal 24 to the diameter of pump beam 20 is less than unity in one embodiment. When a fiber bundle is utilized, the ratio of the TEM00 mode diameter of crystal 24 to the diameter of nearly top hat shaped pump beam 20 is less than unity to about 0.83. This is in contrast to prior teachings that a ratio less than unity is inefficient. Rather, this laser is high power and highly efficient. The respective diameters are illustrated in FIG. 8, where the TEM00 diameter is 62 and the top hat pump beam diameter is 64 while a more conventional mode-matched TEM00 diameter is shown in 66.

Conventional mode matching, in the absence of thermal lensing, dictates that the ratios of the TEM00 mode diameter to the diameter of pump beam 20 should be optimized according to the following:

$$Q = \int\int\int Io(r,z)Po(r,z)dV,$$

where Io(R,z) is the normalized intensity distribution of the TEM00 mode in the crystal, and Po(r,z) is the normalized distribution of absorbed pump light in the crystal.

For conventional mode matching, the factor Q should be maximized in order to minimize laser threshold and maximize slope efficiency. It is known that for conventional mode matching, this overlap factor Q is maximized when the pump beam diameter in the crystal is smaller than the TEM00 mode diameter in the crystal. This occurs when the ratio R1 of TEM00 mode diameter to pump beam diameter in the crystal is greater than 1. The TEM00 mode diameter in the crystal is defined traditionally as the diameter at which the mode intensity is $1/e^2$ ($\sim 13.5\%$) of its peak intensity. The pump beam diameter in the crystal is defined as the diameter of the image of the pump beam in the crystal; the intensity distribution of the pump beam is close to a "top hat" profile. The ratio R of the TEM00 mode diameter to the pump beam diameter in the crystal is greater than unity in a conventional mode-matched laser. In the present invention, it is less than unity. In combination with the strong thermal lens, this non-mode matched configuration yields a high power, highly efficient TEM00 laser.

Although prior investigators have indicated that ratios R less than unity should result in lasers that are not efficient, for either low or high aberration materials, the present invention produces a different result. In one embodiment, the combination of a strong thermal lens laser crystal 24, such as Nd:YVO4, management of heat conduction of crystal 24 through its "c" crystal faces, and a ratio of TEM00 mode diameter to pump beam diameter in the crystal of less than unity and the use of a fiber-coupled diode bar pump source 18 results in a highly efficient high power laser that operates in the TEM00 mode over a wide range of pump powers and produces a polarized output.

The laser of the present invention can have the following characteristics: output powers in the range of about 1 to 12 W; an overall optical efficiency greater than about 25%; an optical slope efficiency in a TEM00 mode of greater than 40%; a ratio of the TEM00 mode diameter to the pump beam diameter in the crystal in the range of about 1.2 to 0.8, preferably less than 1.0 to 0.83; an M2 of less than 1.2, and preferably less than about 1.05; and a least squares deviation of a beam profile from a gaussian of less than about 10%, and preferably about 1%.

In one embodiment, laserhead 10 has a length of about 10 cm. A Nd:YVO4 crystal 24 is mounted in heat sink 26 and positioned along optical axis 16. Crystal 24 has a cubic geometry and measures 4 mm along each side. Heat conduction from crystal 24 is affected along the "c" axis crystal faces, and the "a" axis crystal faces are thermally isolated. A bundle of optical fibers is coupled to a 16 W diode bar 18 and produces a top hat shaped pump beam 22. Pump beam 22 is imaged by lenses 34 and 36 onto optical end face 38 of crystal 24 so that only the central portion of the pumped volume is utilized. The ratio of the TEM00 mode diameter of crystal 24 to the diameter of top hat shaped pump beam 22 is less than unity, and as low as 0.83. A polarized, round, diffraction limited gaussian output beam 32 with 7 W of output is produced. Output beam 32 has an M2 less than about 1.05. The least squares deviation of the beam profile from a gaussian is less than 1%. Optical slope efficiency of laserhead 10 is about 50% and the overall efficiency about 37.5%. This is highly efficient and has high power. Similar lasers that use more than one diode pump source produce as much as 12 w, using similar mode size and pump size techniques to produce a high power highly efficient TEM00 laser output.

The laser is useful in a variety of applications including, material processing, medical therapeutic, instrumentation, research, telecommunications, optical storage, entertainment, image recording, inspection, measurement and control, barcode scanning and sensing.

Additionally, the laser can be Q-switched or mode locked, used to generate harmonics or pump optical parametric oscillators.

Changes and modifications in the specifically described embodiments can be carried out without departing from the scope of the invention which is intended to be limited only by the scope of the appended claims.

What is claimed is:

1. A high power diode pumped laser, comprising:
   a resonator mirror and an output coupler defining a laser resonator with a resonator optical axis;
   a birefringent strong thermal lens laser crystal mounted in the resonator along the resonator optical axis;
   a diode pump source supplying a pump beam to the laser crystal in the laser resonator generating a pump beam diameter greater than a TEM00 mode diameter in the laser crystal, producing a polarized, nearly diffraction limited, output beam with high efficiency; and
   a power source supplying power to the diode pump source.

2. The laser of claim 1, wherein the laser has an optical slope efficiency in a TEM00 mode of greater than about 40%.

3. The laser of claim 1, wherein the laser has an overall efficiency greater than about 25%.

4. The laser of claim 1, wherein a ratio of the TEM00 mode diameter to the pump beam diameter in the crystal is in the range of about less than 1.0 to 0.83.

5. The laser of claim 1, wherein the output beam has an M2 of less than about 1.2.

6. The laser of claim 1, wherein the output beam has an M2 of less than about 1.05.

7. The laser of claim 1, wherein the output beam has a least squares deviation of a beam profile from a gaussian of less than about 10%.

8. The laser of claim 1, wherein the laser produces an output beam with a power of about 1 to 12 W.

9. The laser of claim 1, wherein the laser produces an output beam with a power greater than about 4 W.

10. The laser of claim 1, wherein the resonator has a length of about 10 cm.

11. The laser of claim 1, wherein the crystal is Nd:YVO4.

12. The laser of claim 11; wherein a percentage of Nd in the crystal is about 0.5 to 3.0%.

13. The laser of claim 1, further including an aperture stop positioned in the resonator between the resonator mirror and the output coupler along the resonator optical axis.

14. The laser of claim 1, further including a Q-switch in the resonator.

15. The laser of claim 1, wherein the diode pump source is a diode bar.

16. The laser of claim 1, wherein the diode pump source is a plurality of diode bars.

17. The laser of claim 1, wherein the diode pump source includes a plurality of optical fibers.

18. The laser of claim 1, wherein the diode pump source includes a plurality of fiber bundles.

19. The laser of claim 17, wherein the pump beam has a nearly top hat shape geometry.

20. The laser of claim 1, wherein the crystal has a non-cylindrical geometry.

21. The laser of claim 1, wherein the crystal has a cubic geometry.

22. The laser of claim 1, wherein the crystal has a rectangular geometry.

23. The laser of claim 1, wherein the laser has a plurality of high reflectors.

24. A high efficiency diode pumped laser, comprising:
   a high reflector and an output coupler defining a laser resonator with a resonator optical axis;
   an anisotropic strong thermal lens;
   a heat sink mount for the laser crystal including a heat sink for conducting substantially all heat generated in the laser crystal away from the laser crystal;
   a diode pump source supplying a pump beam to the laser crystal in the laser resonator generating a pump beam diameter greater than a TEM00 mode diameter in the laser crystal, producing a substantially round, nearly diffraction limited output beam with high efficiency; and
   a power source supplying power to the diode pump source.

25. The laser of claim 24, wherein the laser has a plurality of high reflectors.

26. The laser of claim 24, wherein the laser has an optical slope efficiency in a TEM00 mode of greater than 40%.

27. The laser of claim 24, wherein the laser has an overall efficiency greater than about 25%.

28. The laser of claim 24, wherein a ratio of the TEM00 mode diameter to the pump beam diameter in the crystal is in the range of about less than 1.0 to 0.83.

29. The laser of claim 24, wherein the output beam has an M2 of less than about 1.2.

30. The laser of claim 24, wherein the output beam has a substantially gaussian beam profile.

31. The laser of claim 24, wherein the laser produces an output beam with an output power of about 1 to 12 W.

32. The laser of claim 24, wherein the laser produces an output beam with an output power greater than about 4 W.

33. The laser of claim 24, wherein the resonator has a length of about 10 cm.

34. The laser of claim 24, wherein the crystal is Nd:YVO4.

35. The laser of claim 34, wherein a percentage of Nd in the crystal is about 0.5 to 3.0%.

36. The laser of claim 24, further including an aperture stop positioned in the resonator between the high reflector and the output coupler along the resonator optical axis.

37. The laser of claim 24, further including a Q-switch in the resonator.

38. The laser of claim 24, wherein the diode pump source is a diode bar.

39. The laser of claim 24, wherein the diode pump source is a plurality of diode bars.

40. The laser of claim 24, wherein the diode pump source includes a plurality of optical fibers.

41. The laser of claim 24, wherein the diode pump source includes a plurality of optical fiber bundles.

42. The laser of claim 40, wherein the pump beam is a nearly top hat geometry.

43. The laser of claim 24, wherein the crystal has a non-cylindrical geometry.

44. The laser of claim 24, wherein the crystal has a cubic geometry.

45. The laser of claim 24, wherein the crystal has a rectangular geometry.

46. A high power diode pumped laser, comprising:
   a resonator mirror and an output coupler defining a laser resonator with a resonator optical axis;
   a non-birefringent strong thermal lens laser crystal mounted in the resonator along the resonator optical axis;
   a polarization device positioned in the resonator between the resonator mirror and the output coupler;
   a diode pump source supplying a pump beam to the laser crystal in the laser resonator generating a pump beam diameter greater than a TEM00 mode diameter in the laser crystal, producing a polarized, nearly diffraction limited, output beam with high efficiency; and
   a power source supplying power to the diode pump source.

47. A high power diode pumped laser, comprising:
   a resonator mirror and an output coupler defining a laser resonator with a resonator optical axis;
   a birefringent strong thermal lens laser crystal mounted in the resonator along the resonator optical axis;
   a diode pump source supplying a pump beam to the laser crystal in the laser resonator generating a pump beam diameter greater than a TEM00 mode diameter in the laser crystal, producing a polarized, nearly diffraction limited, output beam with high efficiency;

an aperture stop positioned in the resonator between the resonator mirror and the output coupler along the resonator optical axis;

a Q-switch in the resonator; and a power source supplying power to the diode pump source.

48. A high power diode pumped laser, comprising:

a resonator mirror and an output coupler defining a laser resonator with a resonator optical axis;

a non-birefringent strong thermal lens laser crystal mounted in the resonator along the resonator optical axis;

a polarization device positioned in the resonator between the resonator mirror and the output coupler;

a diode pump source supplying a pump beam to the laser crystal in the laser resonator generating a pump beam diameter greater than a TEM00 mode diameter in the laser crystal, producing a polarized, nearly diffraction limited, output beam with high efficiency;

an aperture stop positioned in the resonator between the resonator mirror and the output coupler along the resonator optical axis;

a Q-switch in the resonator; and a power source supplying power to the diode pump source.

* * * * *